Feb. 1, 1938.    D. S. BRUCE ET AL    2,106,792
METHOD OF MAKING VIBRATION DAMPED STRUCTURE
Filed July 5, 1935
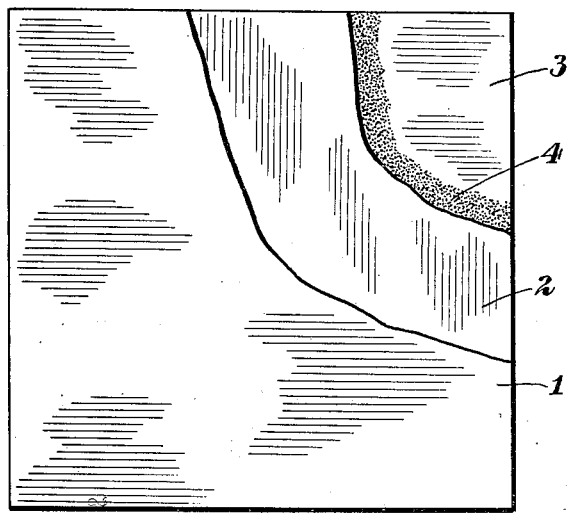
INVENTORS.
DONALD S. BRUCE.
ROY E. BERG.
BY D. N. Halstead.
ATTORNEY.

Patented Feb. 1, 1938

2,106,792

UNITED STATES PATENT OFFICE 2,106,792

METHOD OF MAKING VIBRATION-DAMPED STRUCTURE

Donald S. Bruce, Somerville, and Roy E. Berg, Plainfield, N. J., assignors to Johns-Manville Corporation, New York, N. Y., a corporation of New York Application July 5, 1935, Serial No. 29,928

1 Claim. (Cl. 154—28)

This invention relates to a vibration-damped structure and to the method of making the same.

There is wide and important use of vibration-damping material on vibratile objects, such as sheet metal panels of automobile bodies or home or office furniture.

The type of vibration-damping material that is preferred for many uses is an incompletely saturated felt of rag fibres or the like containing, for instance, asphalt saturant in proportion substantially less than that used in making saturated roofing felts or the like.

Such vibration-damping material, as sold originally, is frequently provided with a preapplied layer of cementing material. Thus, the cementing material may be applied in hardenable form, as in solution in a volatile solvent, to a face of the vibration-damping material, the cementing layer then caused to harden as by the evaporation of the volatile solvent therefrom, and the exposed face of the cementing layer softened, as by brushing or spraying on of solvent, just before application to the object the vibration of which is to be damped.

While the method and structure described have been used on a very large scale, certain difficulties have been encountered. Thus, special care is necessary to avoid loosening of the adhered vibration-damping material from the vibratile object.

It is an object of the present invention to provide a more certain method of securing the vibration-damping material to the vibratile object. Another object is to provide a special solvent mixture for use in softening the cementing layer before the damping material is applied to the vibratile object. Another purpose is to provide a vibration-damping structure of increased firmness of adherence between the several elements thereof. Other objects and advantages will appear from the detailed description that follows.

In the preferred embodiment, the invention comprises the method of and the structure resulting from using a solution of volatile solvent and a viscosity-increasing agent associated therewith, for softening the exposed face of the preapplied cementing layer before application to the vibratile object.

The invention is illustrated in the drawing and will be described, for the purpose of illustration, in connection therewith.

The figure shows a plan view, partly broken away for clearness of illustration, of a vibration-damped structure made in accordance with the invention.

There are shown vibration-damping material 1, suitably, a partially saturated felted sheet as described, a cementing layer 2 applied to a face thereof, a vibratile object 3, such as thin sheet metal, and a very thin film 4 including the viscosity-increasing agent and adhering the cementing layer 2 to the object 3.

In making the vibration-damped structure shown, there is first provided a partially saturated felt, a layer of suitable cementing material is applied thereto, and the cementing layer is caused to harden. The materials and the steps in the preparation of the vibration-damping material, with preapplied cement layer, may be those described in U. S. Patent 2,008,655, issued to George W. Clarvoe on July 16, 1935. Thus, the cementing layer may comprise a viscous, water-insoluble, solvent-softening plastic material, such as asphalt or a bituminous residue from petroleum distillation, and a filler. Preferably, the composition comprises, also, a resinous material.

To the exposed face or surface of the preapplied cementing layer, there is applied a flowable mixture including a volatile solvent for the cementing layer and a viscosity-increasing agent associated with the said solvent, as by solution or dispersion therein.

The mixture of solvent and viscosity-increasing agent is applied to the preapplied cementing layer in any suitable manner, as by brushing, roller-coating, or spraying. There results at once a softened surface of the preapplied layer.

The composite is then adhered to the vibratile object, as by having the softened surface pressed, by a roller or otherwise, against the said object.

The said solvent should be one that evaporates in a reasonable time, permitting quickly adhering the vibration-damping material to the vibratile object. For best results, the rate of evaporation of the solvent should be of the order of that of toluol, say, within the range between the rates of evaporation of benzol, on the one side, and xylol, on the other.

A suitable solvent is a mixture of 10 parts by volume of solvent naphtha (from coal tar distillation), 40 parts of carbon tetrachloride, and 50 parts of petroleum naphtha of evaporation rate about like that of cleaners' naphtha or somewhat slower.

The viscosity-increasing agent should be a material of the type of rubber, that is, a material that is adapted to be dispersed in the solvent and increase greatly the viscosity of the solvent when used in such small amounts as not to affect substantially adversely the adhesiveness of the face of the adhesive composition in contact with the vibratile object in the finished assembly. Thus, there may be used to advantage, as viscosity-increasing agents, rubber itself, preferably, in unmilled form as gum balata, polymerized chloroprene of rubber consistency, and aluminum stearate gel of about 2% concentration by weight in the solvent mixture.

When rubber is used, it is used in a limited proportion only, as, for example, in the proportion of about two parts by weight or less to 100 parts of the solvent mixture. Preferably, there is used unmilled rubber in the proportion of about two-thirds part by weight to 100 parts of solvent. When other materials are substituted for rubber, as the viscosity-increasing agent, various proportions may be used, depending upon the viscosity produced by a given amount of the agent. In general, a viscosity approximately equal to that produced by the preferred proportion of unmilled rubber is satisfactory, and the selected agent may be used in such a proportion as to give such viscosity.

Excellent adherence is obtained when the method and composition desired are used.

Once the beneficial results have been observed, various theories may be advanced to explain them. Thus, the increase in viscosity, due to the use of rubber or the like, decreases the rate of diffusion of the solvent mixture into the preapplied cementing layer and thus causes increased tackiness of the superficial portion, without increasing, in proportional degree, the softness of the interior of the cementing layer. Also, the increased viscosity of the solvent mixture makes possible the smooth application of a relatively thick coating of the said mixture over the preapplied cementing layer.

Regardless of what the explanation of the cause of the major advantage may be, we make use of all of the advantages obtained, without regard to the correctness of any theory.

The details that have been given are for the purpose of illustration, not restriction. Variations or departures therefrom which conform to the spirit of the invention are intended to be included within the scope of the claim.

What we claim is:

In making a vibration-damped structure including a vibratile object, the method which includes providing a vibration-damping sheet, applying a layer of hardenable bituminous cementing material to a face of the sheet and causing the said layer to harden, applying to the exposed face of the hardened layer a flowable mixture including rubber dissolved in a volatile solvent for the cementing material, to soften the said exposed face, and then adhering the product by means of the softened face to the vibratile object, the proportion of the rubber being adequate to increase substantially the viscosity of the said solvent but not substantially in excess of about two parts by weight to one hundred parts of the solvent.

DONALD S. BRUCE.
ROY E. BERG.